US011175526B2

(12) United States Patent
Pierre

(10) Patent No.: US 11,175,526 B2
(45) Date of Patent: Nov. 16, 2021

(54) IMAGE GENERATING DEVICE COMPRISING A THERMAL CONTACT ZONE, AND ASSOCIATED HEAD-UP DISPLAY

(71) Applicant: VALEO COMFORT AND DRIVING ASSISTANCE, Créteil (FR)

(72) Inventor: Lenaic Pierre, Creteil (FR)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 379 days.

(21) Appl. No.: 16/313,997

(22) PCT Filed: Jun. 28, 2017

(86) PCT No.: PCT/EP2017/066072
§ 371 (c)(1),
(2) Date: Sep. 18, 2019

(87) PCT Pub. No.: WO2018/002187
PCT Pub. Date: Jan. 4, 2018

(65) Prior Publication Data
US 2020/0387025 A1 Dec. 10, 2020

(30) Foreign Application Priority Data
Jun. 29, 2016 (FR) ...................................... 1656140

(51) Int. Cl.
G02F 1/1333 (2006.01)
B60K 35/00 (2006.01)
(Continued)

(52) U.S. Cl.
CPC ........ *G02F 1/133385* (2013.01); *B60K 35/00* (2013.01); *G02B 27/0149* (2013.01);
(Continued)

(58) Field of Classification Search
None
See application file for complete search history.

(56) References Cited

U.S. PATENT DOCUMENTS

2004/0062040 A1 4/2004 Blume et al.
2015/0300576 A1 10/2015 Matsuura

FOREIGN PATENT DOCUMENTS

WO 2015/159030 A1 10/2015

OTHER PUBLICATIONS

International Search Report and Written Opinion in corresponding International Application No. PCT/EP2017/066072, dated Oct. 2, 2017 (13 pages).

(Continued)

*Primary Examiner* — Richard H Kim
(74) *Attorney, Agent, or Firm* — Osha Bergman Watanabe & Burton LLP

(57) ABSTRACT

The invention relates to an image generating device (20) comprising:—at least one light source (23),—a screen (21) designed to be backlit by said light source, and—a reflector (25) arranged between said light source and screen and designed to reflect at least some of the light emitted by the light source. According to the invention, the reflector defines a housing (280) designed to receive the screen such that the reflector has a zone (290) of thermal contact with the screen. The invention also relates to a head-up display comprising an image generating device of this type.

11 Claims, 2 Drawing Sheets

(51) Int. Cl.
*G02B 27/01* (2006.01)
*G02F 1/13357* (2006.01)

(52) U.S. Cl.
CPC .. *G02F 1/133605* (2013.01); *G02F 1/133608* (2013.01); *B60K 2370/1529* (2019.05); *B60K 2370/23* (2019.05); *B60K 2370/33* (2019.05); *G02F 1/133603* (2013.01)

(56) References Cited

OTHER PUBLICATIONS

International Preliminary Report on Patentability in corresponding International Application No. PCT/EP2017/066072, dated Jan. 1, 2019 (6 pages).

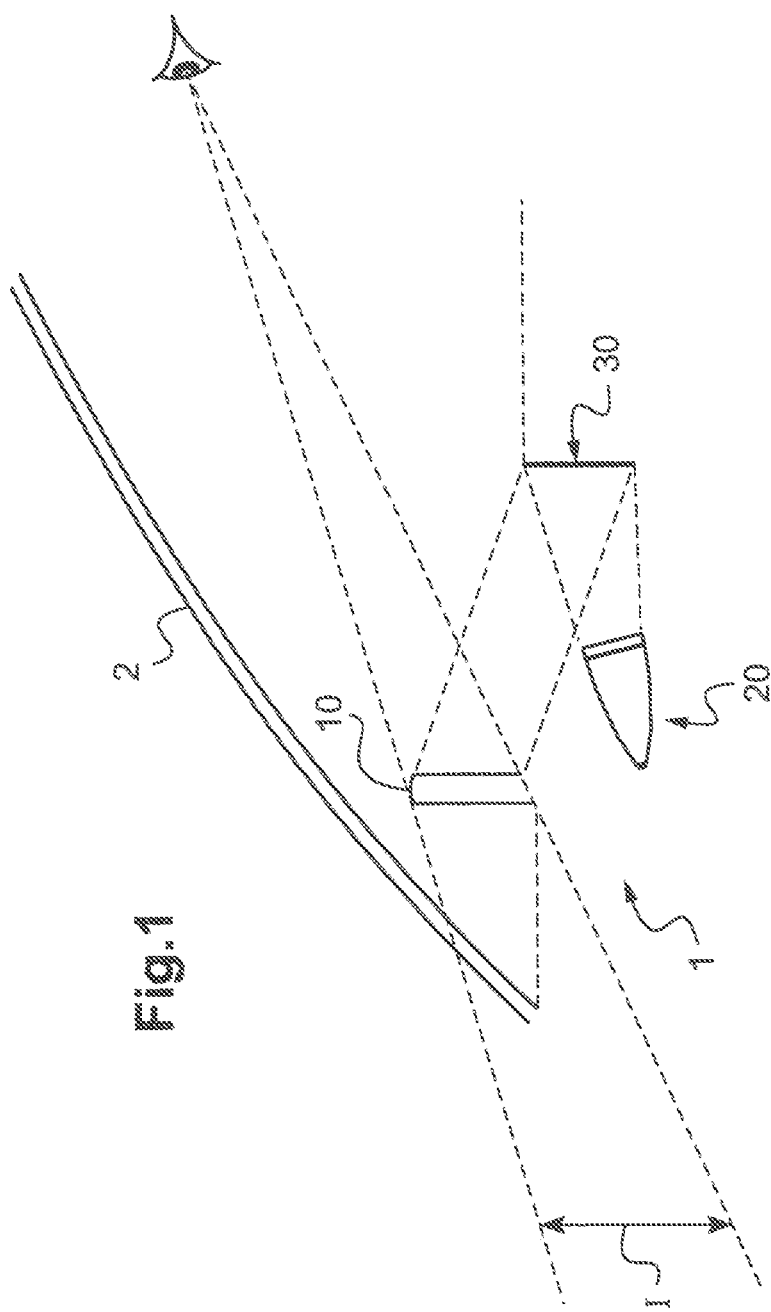

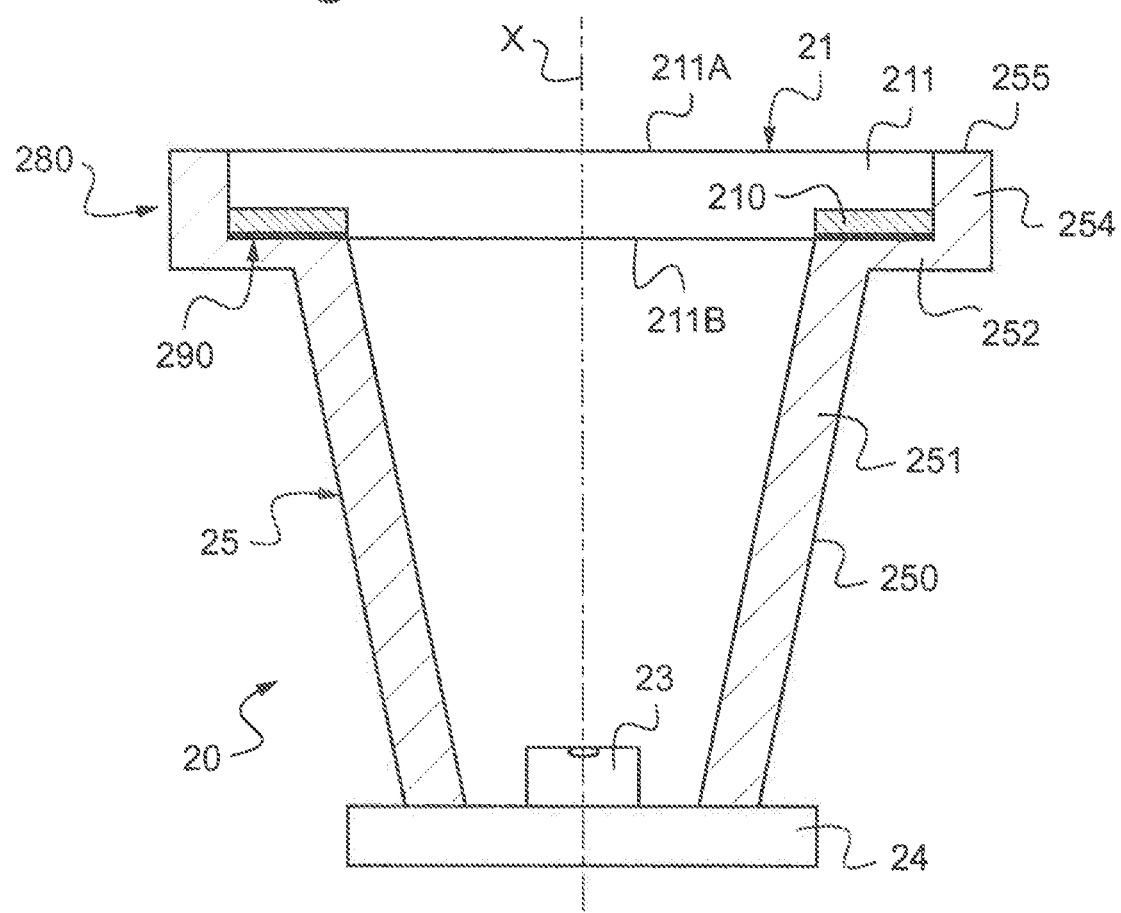

ved by virtue of the invention, the screen is in physical

IMAGE GENERATING DEVICE COMPRISING A THERMAL CONTACT ZONE, AND ASSOCIATED HEAD-UP DISPLAY

TECHNICAL FIELD TO WHICH THE INVENTION RELATES

The present invention relates generally to the field of head-up displays for vehicles.

It relates more particularly to an image-generating device for a head-up display comprising at least one light source, a screen adapted to be backlit by said light source, and a reflector, arranged between said light source and said screen, and adapted to at least partly reflect the light emitted by the light source.

The invention applies particularly advantageously to the case where it is wanted for the image-generating device to be arranged in a housing of small size of the vehicle.

TECHNOLOGICAL BACKGROUND

The principle of head-up displays for vehicles is to project images, useful in particular for driving, directly into the visual field of the driver.

For that, the head-up displays generally comprise an image-generating device adapted to generate images and a device for projecting the generated images adapted to transmit these images to a semi-transparent plate placed in the visual field of the driver.

Most of the image-generating devices used today comprise alight source backlighting a screen adapted to generate the images. This screen absorbs a part of the light which backlights it, which causes the thermal heating thereof.

Now, the temperature of the screen is critical for its correct operation, the latter risking being damaged, even being rendered defective, by an excessively high temperature. The heating of the screen can consequently reduce its life and lead to the replacement thereof.

It is therefore necessary to find solutions aiming to cool the screen, or to avoid the heating thereof.

It is known that the temperature of the screen is greatly linked to the heating created by the light source which backlights it, in particular when said light source comprises light emitting diodes (or LEDs).

A first solution is thus known which consists in placing a temperature probe in the image-generating device, this probe being adapted to monitor the temperature of the screen and automatically regulate, as a function of this temperature, the power generated by the light source.

This first solution presents a major drawback in that the user does not always obtain a display with the desired level of brightness (particularly on the plate) since the light source can be made to operate at reduced power.

Also known is a second solution consisting in opening, at least partially, the image-generating device in order to dispel the heat generated by the light radiation of the light source.

Nevertheless, this second solution does not guarantee the dust-tightness of the image-generating device. Thus, the optics contained in the image-generating device are exposed to dust and risk being damaged.

Furthermore, this second solution means that leaks of light are possible from the light source to the other elements of the head-up display. Stray rays can thus potentially be generated throughout the head-up display and the final quality of the generated image is affected.

OBJECT OF THE INVENTION

In order to remedy the abovementioned drawbacks of the state of the art, the present invention proposes an image-generating device designed to cool the screen that it comprises, or even to avoid the heating of said screen.

More particularly, according to the invention, an image generating device (for head-up display) is proposed comprising:

at least one light source, a screen adapted to be backlit by said light source, and a reflector arranged between said light source and said screen, and adapted to at least partly reflect the light emitted by the light source, wherein said reflector defines a recess designed to receive the screen in such a way that said reflector has a zone of thermal contact with said screen.

Thus, by virtue of the invention, the screen is in physical contact with the reflector which then serves as heat sink for said screen. In other words, the reflector is thus adapted to drain, by thermal conduction effect, a surplus of heat from the screen.

Furthermore, the reflector defining a recess designed for housing the screen allows for a space-saving in the image-generating device as a whole.

Other nonlimiting and advantageous features of the image-generating device according to the invention are as follows:

the reflector extends along a main axis of extension and comprises a reflection portion and a support portion;

said support portion defines said recess designed to receive the screen and comprises a flat and a rim which rises from said flat so as to surround the screen;

said flat at least partly forms the zone of thermal contact with the screen;

the screen comprises a reinforcing portion forming the zone of thermal contact between the screen and the reflector;

said zone of thermal contact is situated over a periphery of at least one of the faces of said screen;

said reinforcing portion of the screen forms a frame against which is pressed a display portion of said screen;

said reinforcing portion of the screen is produced in a metal material;

the reflector is produced in a surface-metallized (by a treatment depositing a metal layer such as a layer of aluminum, silver, or any other metal) polymer (plastic) material;

the reflector is produced in an ion polymer material;

the reflector is closed on one side by said screen, on the other by said light source, such that said image-generating device forms a closed enclosure;

a heat sink is provided, arranged behind the light source;

provision is made to thermally insulate the reflector and a support of the light source.

The invention also proposes a head-up display comprising an image-generating device as described previously and an image-projecting device adapted to transmit to a semi-transparent plate the images generated by the image-generating device.

In the head-up display according to the invention, the image-projecting device comprises a mirror arranged so as to reflect to the semi-transparent plate the images generated by the image-generating device.

DETAILED DESCRIPTION OF AN EXEMPLARY EMBODIMENT

The following description in light of the attached drawings, given by way of nonlimiting examples, will give a good understanding of what the invention consists of and how it can be produced.

In the attached drawings:

FIG. 1 is a schematic representation of a head-up display according to the invention in position in the vehicle; and FIG. 2 is a schematic cross-sectional representation of an image-generating device according to the invention.

Hereinafter in the description, the terms "front" and "rear" will be used to denote the elements in position in the motor vehicle, in relation to the longitudinal direction of said motor vehicle. The front will denote the side of an element directed toward the driver, in other words the side turned toward the trunk lid, and the rear will denote the side of this element turned toward the hood.

FIG. 1 shows a representation of the main elements of a head-up display 1 intended to equip a vehicle, for example a motor vehicle.

Such a display 1 is adapted to create a virtual image I in the visual field of a driver of the vehicle, such that the driver can see this virtual image I and any information that it contains without having to divert the gaze.

To this end, the display 1 comprises a semi-transparent plate 10 placed in the visual field of the driver (see FIG. 1), an image-generating device 20 adapted to generate images and an image-projecting device 30 adapted to send back to said semi-transparent plate 10 the images generated by the image-generating unit 20.

More specifically, the semi-transparent plate 10 is, here, a combiner 10, that is to say a semi-transparent plate dedicated to the head-up display 1.

Here, such a combiner 10 is placed between the windshield 2 of the vehicle and the eyes of the driver.

As a variant, the semi-transparent plate could be merged with the windshield of the vehicle. In other words, in this variant, it is the windshield of the vehicle which serves as semi-transparent plate for the head-up display.

Moreover, here, the image-projecting device 30 comprises a fold back mirror arranged so as to reflect the images generated by the image-generating device 20 toward the semi-transparent plate 10. Here, said fold back mirror is a planar mirror.

As a variant, the image-projecting device could comprise a plurality of mirrors and/or of other optical elements such as a lens for example.

FIG. 2 represents more specifically the image-generating device 20 of the head-up display 1 in cross section.

This image-generating device 20 here comprises at least one light source 23, a screen 21 backlit by said light source 23, and a reflector 25.

In the example represented, the image-generating device 20 in reality comprises a plurality of light sources 23 mounted on a support 24.

The light sources 23 are, here, aligned at right angles to the cutting plane of FIG. 2.

More specifically, each light source 23 is, here, a light-emitting diode (or LED), and all of these LEDs are mounted on a printed circuit board acting as support 24.

Here, a heat sink (not represented) is provided, placed behind the support 24 of said light sources 23, so as to partly dissipate the heat generated by said heat sources 23.

Advantageously, the reflector 25 and the support 24 are in thermal contact, such that the heat sink of the light sources is also adapted to dissipate the heat from the reflector 25.

As a variant, in particular when using a direct chip mounting technique (or "On Chip Board" technique), it is possible to use, as support, the heat sink usually associated with the light sources.

As another variant, provision could be made to thermally insulate the support of the light sources and the reflector, such that the support cannot transmit heat to the reflector, and vice versa.

In this last variant, it is for example possible to place a part produced in a thermally insulating material, typically plastic, between the support of the light sources and the reflector. It is also possible to place a thermal insulation membrane between the support of the light sources and the reflector.

Advantageously, the support of the light sources does not then transmit heat to the reflector.

It is proposed here to arrange the LEDs in the form of a single row of a plurality of light sources 23, here comprising four light sources 23. As a variant, it may for example be possible to consider the plurality of light sources comprising between two and ten light sources, for example arranged in one or two rows.

The light sources 23 are, here, adapted to backlight the screen 21, said screen 21 being placed at a distance from them. In other words, the screen 21 is lit, on its rear face, by the light sources 23.

In the exemplary embodiment proposed, the screen 21 is a liquid crystal display (LCD) screen, for example with thin film transistors (TFT).

More specifically, the screen here comprises a reinforcing portion 210 adapted to reinforce the screen 21, and a display portion 211 adapted to generate the images when it is backlit.

The display portion 211 comprises a matrix of elements of variable transmittance adapted to form the pixels of an image to be displayed when they are backlit by the light sources 23.

The display portion 211 of the screen 21 comprises a front face 211A which forms the front face of the screen 21 and which is globally planar.

The display portion 211 also comprises a rear face 211B which has a globally planar central zone delimited over its perimeter by a recess, set back relative to said central zone.

Thus, the thickness of the display portion 211 is not constant: it is smaller over the periphery of the screen 21 than at its center.

The reinforcing portion 210 here forms a frame, preferably rectangular, against which is pressed the display portion 211 of the screen 21.

More specifically, the reinforcing portion 210 is, here, clipped against the display portion 211, in a so-called "technical" region of this display portion 211, namely a non-backlit peripheral region of the display portion 211.

More specifically, the reinforcing portion 210 of the screen 21 is adapted to be inserted into the recess of the display portion 211 such that the screen 21, as a whole, has a planar rear face.

Advantageously, the reinforcing portion 210 of the screen 21 is also adapted to protect the screen 21 from any electrical discharges originating from the vehicle.

This reinforcing portion 210 is also adapted to protect the driver, or any other user, against any electrostatic discharges that may occur through contact between said driver and the head-up display.

The reinforcing portion 210 is, here, produced in a material that is both rigid and thermally conductive. For example, it is produced in a metal material such as a rigid metal alloy such as stainless steel.

Thus, the reinforcing portion 210 is adapted to drain the heat originating from the display portion 211 of the screen 21.

The reflector 25 is arranged between the light sources 23 and the screen 21 so as to at least partly reflect the light emitted by the light sources 23 toward the screen 21.

Furthermore, notably, the reflector 25 defines a recess 280 designed to receive the screen 21 such that said reflector 25 has a zone of thermal contact with said screen 21.

Here, the reflector 25 is closed, on one side by the screen 21, and on the other side by the light sources 23 (namely, in practice, by the support 24 of the light sources 23).

Thus, the image-generating device 20 forms a closed enclosure.

Advantageously, the internal elements of the image-generating device are then protected from dust or other external stresses.

The closed enclosure also ensures that no stray ray will be emitted from the light sources 23 directly toward the other elements of the head-up display 1. In other words, the fold back mirror 30 and/or the semi-transparent plate 10 will receive from the image-generating device 20 only the rays that have passed through the screen 21.

More specifically, to fulfil the three functions of reflection, of housing of the screen and of thermal conduction, the reflector 25 extends along a main axis X of extension and comprises a reflection portion 250 and a support portion 255.

The reflection portion 250 has a globally flared, or frustoconical, form, from the light sources to the support portion 255.

To this end, is comprises four walls 251 facing one another in pairs, and which extend slightly obliquely relative to the main axis X of extension, from the light sources 23 to said support portion 255 of the reflector 25.

The four walls 251 are contiguous such that the reflection portion 250 has, at one end, a first aperture where the light sources 23 are housed, and, at the other end, a second aperture, of surface area greater than that of the first aperture, from which the support portion 255 of the reflector 25 extends.

The inner face of the reflection portion 250 of the reflector 25 has a high reflection coefficient (for example diffuse reflection). It can in that respect for example be white. It can as a variant be covered with a reflecting layer (for example of chromium or aluminum) so as to obtain a high reflection coefficient (for example specular reflection).

In the example represented here, the four walls 251 are planar. As a variant, the walls can take any form particularly suited to reflect the maximum of light to the screen.

Thus, the form and the material of the inner face of the reflector 25 are particularly adapted to reflect all of the light rays emitted by the light sources 23 toward the screen 21.

Each wall 251 is, here, prolonged by a flat 252 which extends outward from said reflector 25, in a plane globally parallel to the support 24 of the light sources 23.

The flats 252 are adapted to accommodate the reinforcing portion 210 of the screen 21, as is represented in FIG. 2.

Each flat 252 is itself prolonged by a rim 254, which extends globally at right angles to said corresponding flat 252, away from the light sources 23.

Thus, each rim 254 is globally parallel to the main axis X of extension of the reflector 25.

The support portion 255 of the reflector 25 is thus formed by the four flats 252 and by the four rims 254 prolonging the four walls 251.

The support portion 255 thus defines the recess 280 for receiving the screen 21.

More specifically, the rims 254 of the support portion 255 surrounds the screen 21 to form a frame around said screen 21 when the latter is in contact with the flats 252 of said reflector 25.

By virtue of the support portion 255 of the reflector 25, the screen 21 is incorporated in the reflector 25, which creates a space-saving for the head-up display 1. The image-generating device can thus more easily be incorporated in a motor vehicle dashboard.

Advantageously, the reflector 25 also serves here as heat sink for the screen 21.

More specifically, the reflector 25 is adapted to dispel the heat which has built up in the screen 21 (because of the absorption, by the screen, over part of the backlighting light).

To do this, the reflector 25 has a zone of thermal contact 290 with the screen 21.

The zone of thermal contact 290 is situated on a periphery of at least one of the faces of said screen 21.

Here, the zone of thermal contact 290 is situated over all the periphery of the rear face of the screen 21. Advantageously, that makes it possible to more easily transmit to the reflector 25 the heat accumulated in said screen 21, this heat being first of all accumulated on the rear face of the screen since it originates from the light flux backlighting the screen 21.

In practice, the zone of thermal contact 290 between the screen 21 and the reflector 25 is formed by the reinforcing portion 210 of said screen 21.

In other words, the zone of thermal contact 290 is, here, situated on the flats 252 of the reflector 25, the latter being in thermal contact with the reinforcing portion 210 of the screen 21.

For the reflector 25 to be able to support the screen 21 while ensuring an effective thermal conduction, the reflector 25 is produced in a material that is both rigid and a good heat conductor, that is to say suitable for draining the heat from the reinforcing portion 210 of the screen 21 to the walls 251 of the reflector 25.

Here, it is produced in a metal material such as a metal alloy, for example stainless steel.

As a variant, the reflector can be produced in a surface-metallized polymer material, that is to say a polymer material covered with a thin metal layer, such as a layer of silver, aluminum, or any other metal. The thin metal layer is produced by a conventional surface treatment.

In practice, the main material of the reflector is then the polymer material, and an inner face (or outer face) of the reflector is metallized. The polymer material used, more commonly called plastic, is for example polycarbonate (abbreviated PC), high temperature polycarbonate (abbreviated PC HT), or even polymethylmethacrylate (abbreviated PMMA).

As another variant, the reflector can be produced in a rigid ion polymer material, even a polymer material. An example of ion polymer material is Makrolon® TC8030 (thermoconductive polycarbonate).

Provision is made here for the thermal contact to be a physical contact between the reinforcing portion 210 of the screen 21 and the reflector 25. To this end, the reinforcing portion 210 of the screen 21 and the flats 252 of the support portion 255 of the reflector 25 are designed to be perfectly contiguous, that is to say that they are in contact, with no intermediate layer of air.

As a variant, provision can be made for the screen and the reflector to be connected via a thermal bridge.

By a heat-conduction effect, the heat contained in the screen 21 can then be transferred from the display portion 211 of the screen 21, toward the reinforcing portion 210 of the screen 21 then toward the reflector 25. The reflector 25 distributes the heat over all its surface, that is to say in the four walls 251 that it comprises. Since the walls 251 are in contact with the air, the heat can then be dispelled into the air, by conduction and/or radiation, then possibly by convection into the air.

Furthermore, when the support 24 of the light sources 23 is itself a heat dissipater, or when it is associated with a heat sink, the heat distributed in the walls 251 of the reflector is also dissipated by said support 24 of the light sources 23.

Thus, the reflector 25, alone or combined with the support 24 of the light sources 23, makes it possible to effectively cool the screen 21 and/or avoid the heating of the screen 21. The driver of the vehicle can then obtain the level of brightness that he or she desires for the virtual image seen on the semi-transparent plate 10.

The reflector 25 of the image-generating device 20 according to the invention is therefore suitable for fulfilling several functions, namely, its first reflector function, that of screen support and also that of heat sink, while conferring a great compactness on said image-generating device 20.

According to a variant that is not represented, a diffuser can be provided, arranged in front of the reflector, on the side of the rear face of the screen. Such a diffuser can be produced by means of a film having a smooth face turned toward the light sources and an opposite grainy face, turned toward the rear face of the screen, which produces the diffusion of the light.

This diffuser would be placed directly in contact with the display portion of the screen, in the central zone of this display portion, on the rear face of the screen.

The reinforcing portion of the screen would remain unchanged, such that the zone of thermal contact between the reflector and the screen would remain unchanged.

In another variant, it could be possible to consider each rim of the support portion of the reflector being prolonged by a second flat, extending parallel to the first flat already provided. Thus, the screen would be sandwiched between the two flats and the rim, and the zone of thermal contact between the screen and the reflector would be enlarged.

The invention claimed is:

1. An image-generating device comprising:
   at least one light source; a screen adapted to be backlit by said light source; and
   a reflector arranged between said light source and said screen, and adapted to at least partly reflect the light emitted by the light source, wherein said reflector defines a first recess that receives the screen so that said reflector has a zone of thermal contact with said screen in the first recess,
   wherein the screen comprises a reinforcing portion adapted to reinforce the screen in the first recess, and a display portion configured to generate an image when the screen is backlit,
   wherein the display portion has a reduced thickness within the first recess over the zone of thermal contact to form a second recess, and
   wherein the reinforcing portion is inserted into the second recess such that the screen has a global planar rear face toward the at least one light source.

2. The image-generating device as claimed in claim 1, wherein the reflector extends along a main axis of extension and comprises a reflection portion and a support portion, said support portion defining said recess that receives the screen and comprising:
   a flat at least partly forming the zone of thermal contact with the screen, and
   a rim which rises from said flat so as to surround the screen.

3. The image-generating device as claimed in claim 1, wherein said zone of thermal contact is situated over a periphery of at least one of the faces of said screen.

4. The image-generating device as claimed in claim 1, wherein the reinforcing portion is in contact with both the screen and the reflector to form the zone of thermal contact between the screen and the reflector.

5. The image-generating device as claimed in claim 4, wherein said reinforcing portion of the screen forms a frame against which is pressed a display portion of said screen.

6. The image-generating device as claimed in claim 4, wherein said reinforcing portion of the screen is produced in a metal material.

7. The image-generating device as claimed in claim 1, wherein the reflector is produced in a metal material.

8. The image-generating device as claimed in claim 1, wherein the reflector is produced in a surface-metalized polymer material.

9. The image-generating device as claimed in claim 1, wherein the reflector is closed on one side by said screen, on the other by a support of the light source, such that said image-generating device forms a closed enclosure.

10. A head-up display comprising:
    an image-generating device as claimed in claim 1; and
    an image-projecting device for transmitting to a semi-transparent plate the images generated by the image-generating device.

11. The head-up display as claimed in claim 10, wherein the image-projecting device comprises a mirror arranged so as to reflect to the semi-transparent plate the images generated by the image-generating device.

* * * * *